3,193,258
EGG-BEATER TYPE MIXER
Charles O. Bliss, P.O. Box 47607, Los Angeles 47, Calif.
Filed July 2, 1963, Ser. No. 292,338
1 Claim. (Cl. 259—131)

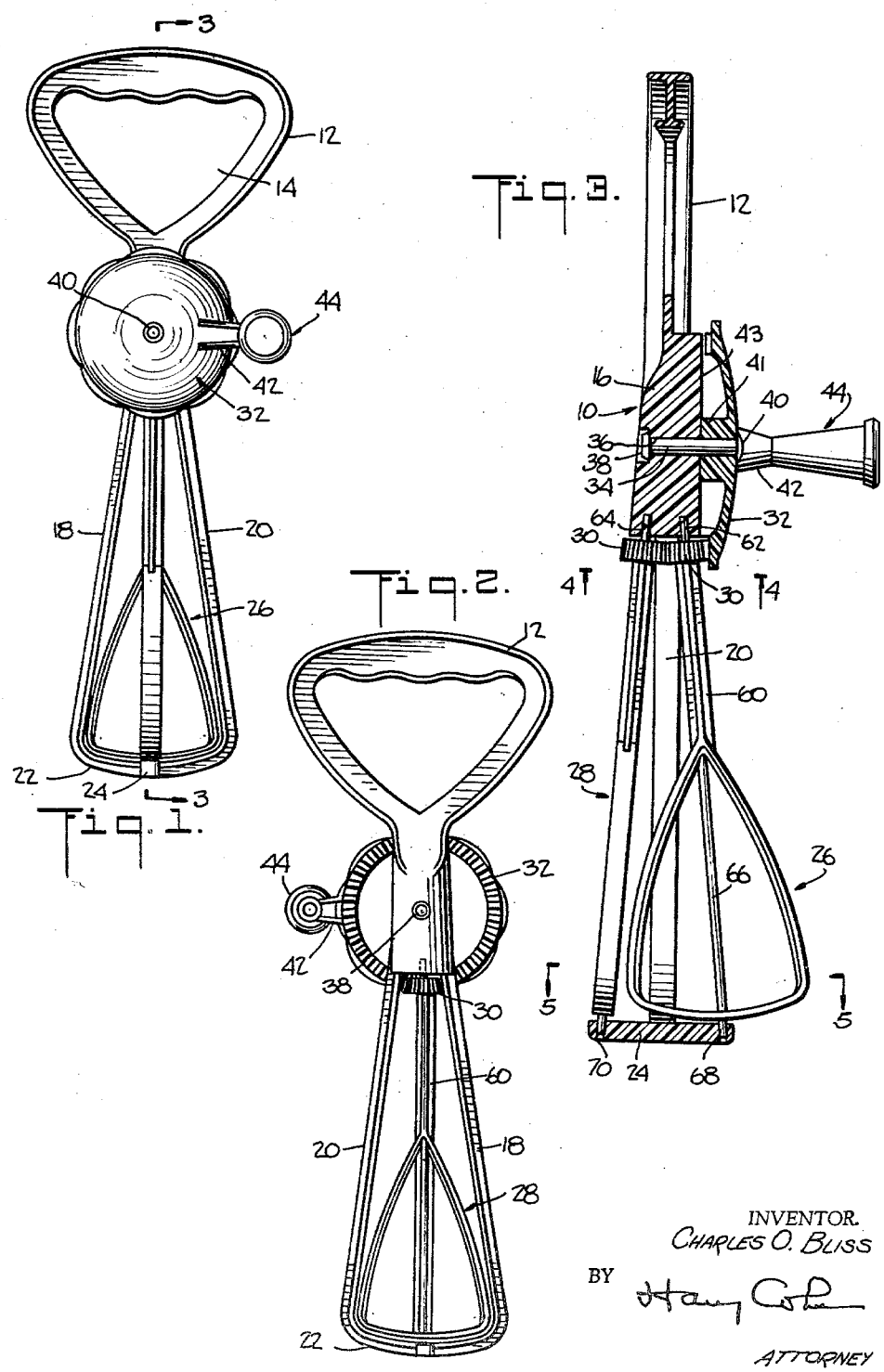

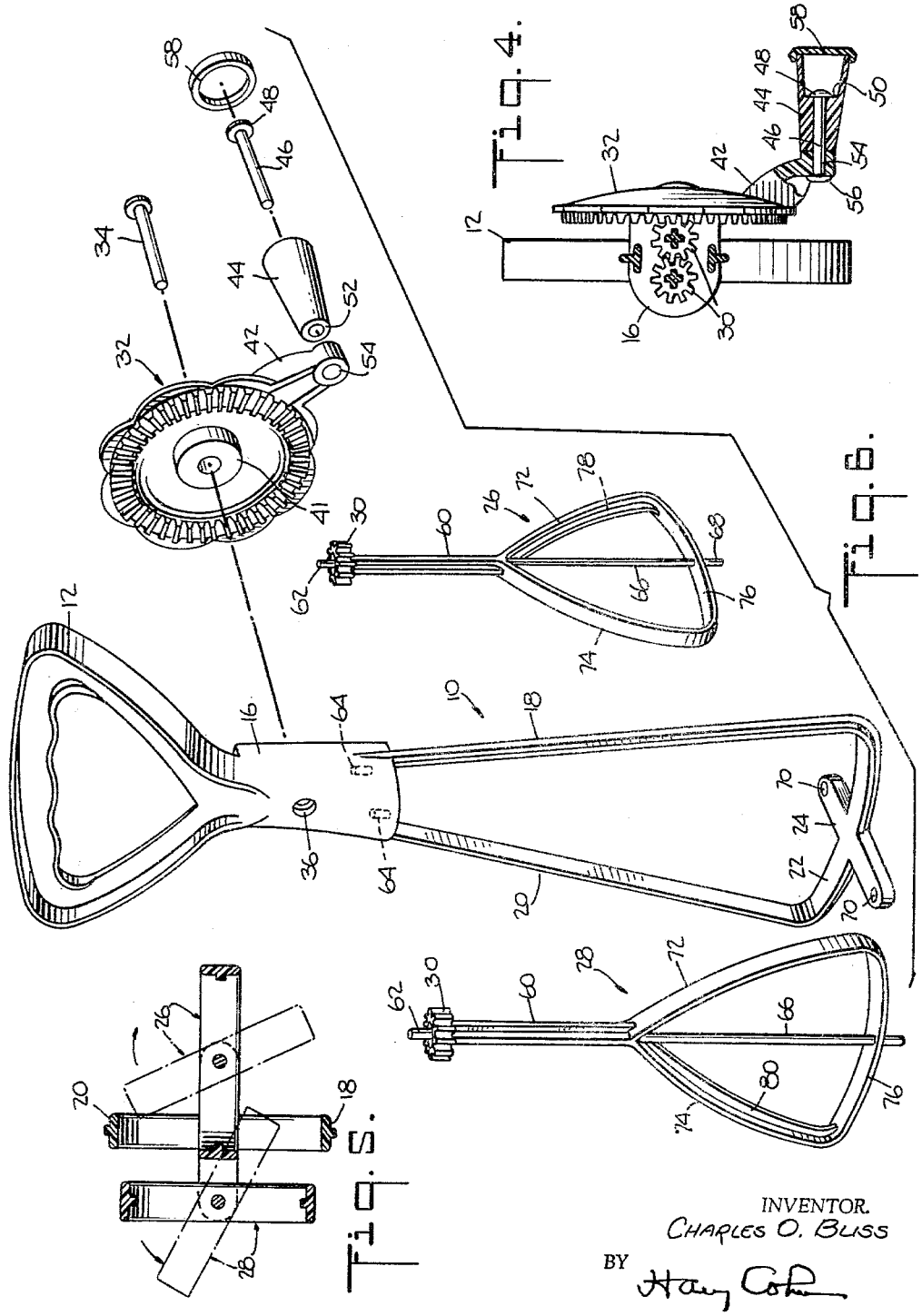

This invention relates to kitchen utensils and more particularly to mixers of the egg-beater type and which are used for beating or mixing various substances.

The primary object of the present invention is the provision of a mixer formed substantially entirely of molded nylon or other molded plastic parts.

Another object is to provide a mixer which comprises a relatively small number of parts which, in their assembled relation, form the mixer.

A further object of the invention is to provide a mixer wherein the mixer elements are readily removable for cleansing purposes and are easily replaced in the frame of the mixer and secured removably therein without extraneous fastening means.

A yet further object of the invention is generally to provide a mixer of the indicated character which is inexpensive to manufacture, attractive in appearance, and durable and effective in operation.

The above and other objects, features and advantages of this invention will be fully understood from the following description considered in connection with the accompanying illustrative drawings.

In the drawings:

FIG. 1 is a front view of the mixer;

FIG. 2 is a rear view thereof;

FIG. 3 is a sectional view on the line 3—3 of FIG. 1;

FIG. 4 is a sectional view on the line 4—4 of FIG. 3;

FIG. 5 is a sectional view on the line 5—5 of FIG. 3; and

FIG. 6 is an exploded perspective view of the parts of the mixer.

Referring to the drawings in detail, the mixer comprises a rigid plastic frame 10 molded in one piece, preferably from nylon. Said frame comprises a handle 12 which defines an opening 14 in which the operator's hand may be inserted for grasping the handle. Said frame also includes the body portion 16 which extends downwardly from handle 12, the laterally spaced side members 18 and 20 which extend downwardly, in diverging relation, from the body portion 16 and which are connected to each other at their lower ends by the transverse bottom member 22. Said frame also includes a cross member 24 in which the lower ends of the mixer members or paddles 26 and 28 are journaled for rotation, the upper ends of said paddles being journaled for rotation in body portion 16, as hereinafter more fully described.

Each of the paddles is provided with an integral gear 30 near its upper end, the two gears being in mesh with each other, one of said gears being in mesh with the driving gear 32. Said driving gear is mounted for rotation on a metal pin 34 which is press fitted in an opening 36 in body portion 16. Said pin is peened at one end thereof as indicated at 38 to prevent its removal from the body portion 16 of the frame and has a head 40 at its opposite end which is in engagement with the front of the driving gear 32. Gear 32 has an integral central collar 41 which abuts the front flat planar surface 43 of frame portion 16 and reinforces said gear and prevents tilting thereof. Said gear is provided with an integral crank 42 to which a crank handle 44 is secured. As shown more clearly by FIGS. 4 and 6, the crank handle 44 is secured to the crank 42 by a metal pin 46 disposed internally of said handle. The head 48 of said pin engages the inner confronting surface 50 of handle 44 and extends through an opening 52 at the inner end of said handle and through an opening 54 in crank 42 and is peened over the portion of crank 42 adjacent said opening 54, as indicated at 56. The forward end of handle 44 is provided with a removable cap 58 which is secured frictionally to said handle after the fastening pin 46 is assembled with the handle and the crank 42.

The mixer paddles 26 and 28 will now be more specifically described, and since they are identical in construction only one need be described. The mixer paddle comprises an upper central stem 60 provided with the gear 30 and with an end portion 62 which extends upwardly beyond the gear and is journaled for rotation in an opening 64 in the lower end of body portion 16 of the frame. A central stem 66 extends downwardly beyond the lower end of the paddle providing an end portion 68 which is journaled for rotation in a recess 70 in the cross member 24 at the bottom of frame 10. The paddle includes the downwardly diverging side members 72 and 74 which are integral at their upper ends with the lower end of the stem 60 and which are connected to each other at their lower ends by the integral transverse bottom member 76. Said side members 72 and 74 are preferably reinforced by central ribs 78 and 80, respectively. It will be understood that the paddles 26 and 28 can be readily removed from the frame 10 by laterally flexing the stem 60 to enable end portion 62 to be withdrawn from the companion recess 64 in the body portion 10. Upon withdrawal of end portion 62 from the companion recess 64 the paddle can be detached from the cross member 24. The removal of the paddles 26 and 28 facilitates and improves the cleansing of the mixer.

As illustrated by FIG. 5, the paddles 26 and 28 are rotatable between the sides 18 and 20 of the frame 10 without interference with each other.

It will be evident from the above description that all of the parts of the mixer, except the metal pins 34 and 46, are made of plastic and, as indicated above, are each molded in one piece from the plastic, nylon being preferred. It is also evident from the above description that the mixed comprises only six parts in addition to the two metal pins and since said plastic parts can be readily molded, the mixer can and does have a desirable ornamental appearance.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claim.

What is claimed is:

A mixer of the egg-beater type, comprising: a rigid plastic frame molded in one integral piece with a handle portion, a body portion extending downwardly from said handle portion, laterally spaced apart elongated side portions extending downwardly from said body portion; a transverse portion connecting the lower ends of said side portions, and a cross portion extending laterally on each side of said transverse portion; two open-bottomed laterally spaced apart elongated recesses formed in the lower side of said body portion; two open-topped laterally spaced apart elongated recesses formed in the upper side of said cross portion, each coaxial with a respective open bottomed recess, one on each side of said transverse portion; two elongated flexible plastic mixer members, each having an upper portion disposed in an open bottomed recess and a lower portion disposed in the coaxial open topped recess, each said mixer member being resilient along its longitudinal axis whereby it may be snapped into and out of its companion sets of recesses, each said mixer member having a gear formed integrally therewith for rotation about said longitudinal axis; a driving plastic gear member mounted for rotation on said body portion; said driving gear member being meshed with one of said mixer member gears, which gear is meshed with the other of said mixer member gears, whereby rotation of said driving gear member causes the rotation of said mixing members.

References Cited by the Examiner

UNITED STATES PATENTS

| | | |
|---|---|---|
| 1,847,563 | 3/32 | Hjert. |
| 1,968,502 | 7/34 | Nordby et al. |
| 2,747,845 | 5/56 | Kohls et al. |
| 2,782,014 | 2/57 | Vault. |

FOREIGN PATENTS

| | | |
|---|---|---|
| 504,856 | 5/39 | Great Britain. |

WALTER A. SCHEEL, *Primary Examiner.*